Aug. 25, 1970     A. ELICH     3,525,121
HEAD AND VISCERA REMOVER
Filed Oct. 3, 1967     3 Sheets-Sheet 1
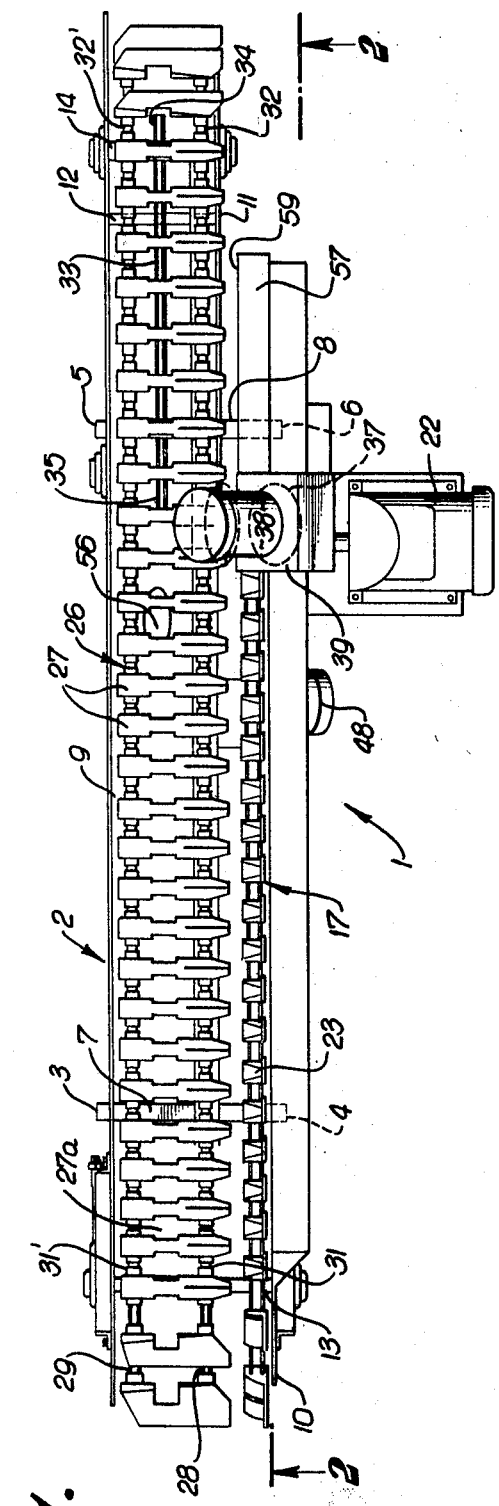
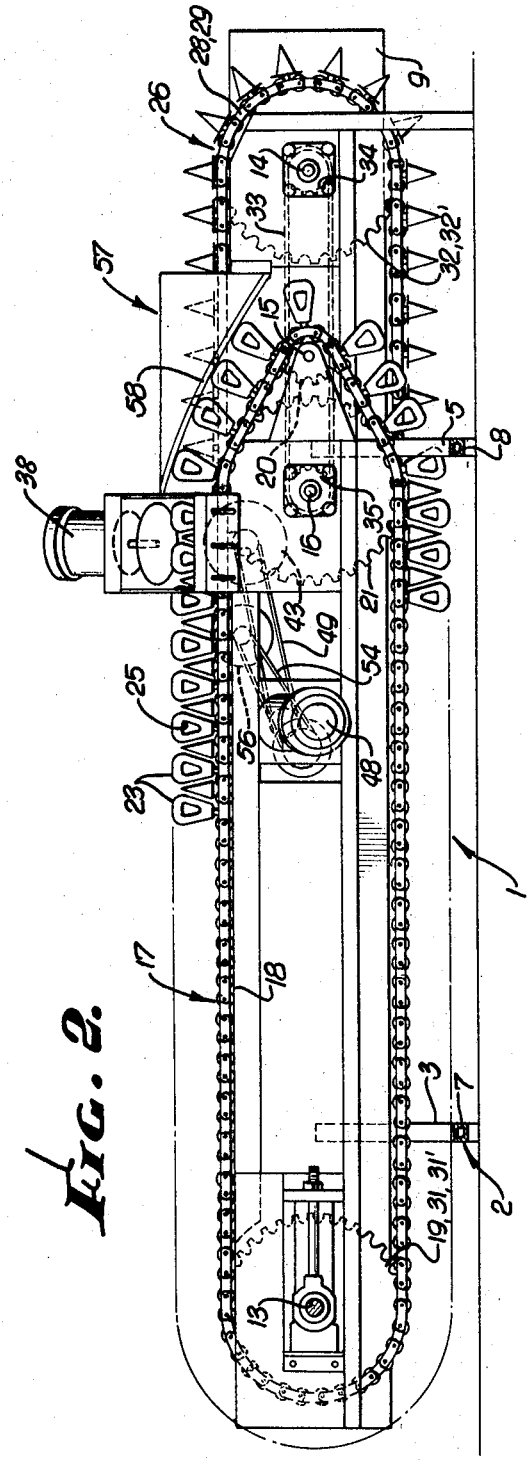
INVENTOR.
ANTON ELICH
BY Lawrence J. Hurst

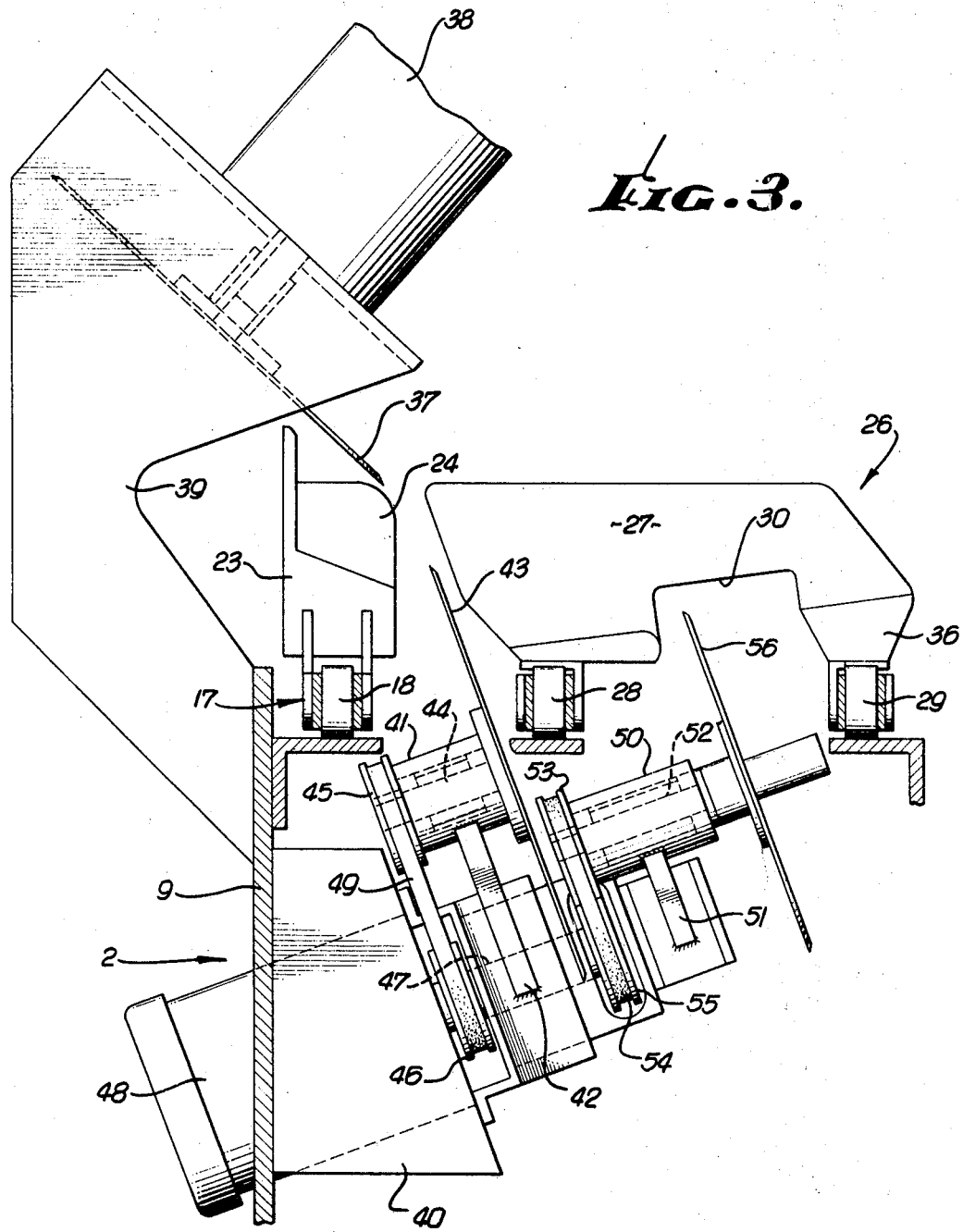

INVENTOR.
ANTON ELICH
BY
Lawrence J. Hurst 3,525,121
HEAD AND VISCERA REMOVER
Anton Elich, Rolling Hills, Calif., assignor to The Ralston Purina Company, St. Louis, Mo., a corporation of Missouri
Filed Oct. 3, 1967, Ser. No. 672,578
Int. Cl. A22c 25/14
U.S. Cl. 17—60                                                  5 Claims

ABSTRACT OF THE DISCLOSURE

A machine for removing the head and viscera of a fish is provided with a frame having a pair of driven conveyors thereon. The conveyors have a substantially parallel path of travel and are adapted to receive the head and body portions of a fish, respectively. The conveyor adapted to receive the head of the fish is provided with a locating member having an opening therein for receiving the nose portion of the fish to abut the eye socket bone thereof and properly position the fish on the conveyors. A knife or saw is provided for cutting into the fish in the head area, and after this cut is made the conveyor carrying the head portion defines a path of travel which is different from that defined by the conveyor carrying the body portion. This relative movement of the conveyors serves to twist the head relative to the body at the cut and removes the head and viscera connected thereto from the body.

BACKGROUND OF THE INVENTION

This invention relates to improvements in the eviscerating of fish and more particularly to a machine for removing the head and viscera of the fish at the same time.

In the past, machines for removing the head and viscera of fish have been provided with means which cut the backbone and then inserted a wedge member into this cut to directly force or impart a straight pull on the head of the fish to pull the head and viscera from the body portion. Other prior art machines have used mechanical means which were inserted into the gill area of the fish to impart a direct force or straight pull on the head to remove the head and viscera from the body portion of the fish.

However, these prior art machines by pulling the head and viscera directly or straightaway from the body had the undesirable or disadvantageous feature of tearing or breaking the pharyngeal muscle or tissue area between the head and body portions. In addition, the large force which was required to pull the head directly from the body not only would tear or break the pharyngeal muscle or tissue area, but would also tear or break the viscera from the head portion such that all of the viscera was not removed from the body portion. Due to the tearing or breaking of the pharyngeal muscle or tissue area and the resultant fact that the viscera was not pulled from the body, an additional operation in the processing of fish was required to insure that a clean fish carcass was obtained.

It is, therefore, a general object of the present invention to provide a machine for removing the head and viscera from a fish in a single operation which does not tear or break the pharyngeal muscle or tissue area and which substantially insures that all of the viscera will be removed from the body portion with the head.

Another object of the present invention is to provide a machine for removing the head and viscera from the body portion of a fish which moves the head portion in a tangential direction relative to the body portion so that the head and viscera is removed by a twisting action and not in response to a straight pull on the head.

Another object of the present invention is to provide cutting means for severing the backbone of the fish at a predetermined position so that valuable meat at the back and just above the eye of the fish or horn area will remain with the body portion, when the head portion is removed therefrom by twisting the head portion relative to the body portion at the cut.

Still another object of the present invention is to provide means which position the fish on the conveyors in relation to the eye socket bone rather than the nose to insure more uniform positioning of various sized fish.

These and other objects and advantages of the present invention will become apparent hereinafter.

SUMMARY

Briefly, the present invention comprises a machine for removing the head and viscera of a fish having a pair of parallel conveyors adapted to receive the head and body portions of the fish, respectively, and cutting means adapted to cut into the fish through the backbone, said conveyors being movable along a parallel path past said cutting means for the cut to be made and thereafter being movable in different directions to twist the head of said fish relative to the body thereof at the cut to remove the head and viscera therefrom.

BRIEF DESCRIPTION OF THE DRAWINGS

In the accompanying drawings which form a part of this specification and wherein like numerals refer to like parts wherever they occur:

FIG. 1 is a diagrammatic top view of a machine for removing the head and viscera from a fish, FIG. 2 is a diagrammatic view of the machine of FIG. 1 taken along the line 2—2, FIG. 3 is an enlarged view of the circular knife arrangement on the present invention, FIG. 4 is a sectional view showing a fish in cross-section which illustrates the areas to be cut by the circular knives of FIG. 3, and FIG. 5 is a diagrammatic side view showing another embodiment of the present invention.

DESCRIPTION OF THE PREFERRED EMBODIMENTS

Referring now to FIGS. 1, 2 and 3, a head and viscera machine 1 is shown having a frame indicated generally at 2 which comprises a pair of angle iron legs 3 and 4 at the leftward end of the machine 1 and another pair of angle iron legs 5 and 6 are provided on the machine at the rightward end thereof. A cross member 7 is provided between the legs 3 and 4, and another cross member 8 is provided between the legs 5 and 6 so that the frame 2 is an integral rigid body. A sheet of metal or plate 9 which serves as one side of machine 1 is connected to the angle iron legs 3 and 5 and another sheet of metal or plate 10 which forms a portion of the other side of the machine 1 is connected to the legs 4 and 6. Another sheet of metal or plate 11 extends beyond the rightward end of the plate 10 to serve as a side of the machine and is rigidly held in place by the cross member 8 and another cross member 12 connected to the rightward end of the plate 9.

A shaft 13 is journaled in the plates 9 and 10 at the leftward end of the frame 2 and another shaft 14 is journaled in the plates 9 and 11 at the rightward end of the frame 2. Shafts 15 and 16 are journaled in the plates 9 and 10 of the frame 2 coaxially with the shafts 13 and 14, and the shaft 16 is positioned predeterminately closer to the shaft 14 than to the shaft 13; with the shaft 15 being positioned in the frame 2 between the shafts 14 and 16.

A conveyor indicated generally at 17 comprising any well known type of chain 18 travels over a sprocket 19 provided on the leftward shaft 13 and over an idler sprocket 20 provided on the shaft 15. The conveyor 17 also passes over a drive sprocket 21 provided on the intermediate shaft 16 which is rotably journaled to a motor 22 for driving said conveyor. The conveyor 17 is provided with a fish head indexing member or cup 23 which has a V-shaped base portion 24 for receiving the head portion of the fish. A preselected aperture 25 is provided in the indexing member 23 in axial alignment with the V-shaped base portion 24 for receiving the nose portion of the fish and abutting the eye socket bone thereof. As shown in FIG. 3, one side of the base portion 24 extends higher than the other side of the base portion to properly position the fish and for other advantageous features which will be discussed later.

Another conveyor indicated generally at 26 is provided with cups 27 which are mounted on a pair of parallel chains 28, 29; said cups provide an area 27a therebetween for receiving the body portion of the fish, and said cups are also provided with slots 30 intermediate the chains 28 and 29. The chains 28 and 29 travel over front sprockets 31 and 31' provided on the shaft 13 and over the rear sprockets 32, 32' on the shaft 14. A drive chain 33 passes over a sprocket 34, provided on the shaft 14 between the sprockets 32, 32', and over a timer sprocket 35, provided on the shaft 16, so that the rotation of the shaft 16 rotates the sprocket 35 to drive the chain 33 and the sprocket 34 with such a speed that the cups 27 and indexing member 23 are in registry as the conveyors 17 and 26 follow their respective paths.

Wedge shaped members 36, as shown in FIG. 3, are provided between the chain 29 on the conveyor 26 and the fish holding cup 27 by suitable means, such as welds, to tilt or slant the fish holding cup 27 toward the fish head receiving or indexing member 23. This slant of the holding cups 27 will insure that the fish, when placed on the conveyors 17 and 26, will slide forward toward the indexing member 23 for the nose thereof to enter the aperture 25. The eye socket bone in the fish head abuts the periphery of the aperture 25 to positively position the fish on the conveyors 17 and 26 in their proper position and the slant of the cups 27 maintains the fish in this position on the conveyors 17 and 26 as it is moved thereby.

Referring more particularly to FIG. 3, a cutting member, saw or blade 37 is rotably mounted to a motor 38 which is bolted to a subframe 39 connected to the frame 2 leftwardly of the shaft 16 and above the conveyors 17 and 26. The cutting member 37 is positioned so that the blade or saw thereof is between the head receiving member 23 and body holding cups 27 for cutting into the fish as it is moved longitudinally past said saw or blade by the conveyors 17 and 26. It should be noted that the saw or blade 37 is provided at a preselected angle to the path of travel of the conveyors 17 and 26, so that the saw or blade 37 will sever the vertebral column in the vicinity of the first precaudal vertebra in the basioccipital bone and make its cut in a posterior direction to retain more meat or the horn area of the fish with the body rather than the head.

Another subframe 40 is connected to the frame 2 beneath the subframe and saw or blade 39, 37 and the conveyors 17 and 26. A spacer 41 is attached to the subframe 40 by a brace 42 which is connected therebetween by suitable means, such as welds, and a second cutting member, saw or blade 43 is mounted on a shaft 44 rotably received in said spacer. The cutting member 43 is positioned so that the blade or saw thereof is between the head receiving member 23 and body holding cups 27 for cutting into the fish in an anterior direction to sever the isthmus of the fish as it is moved longitudinally past said cutting member by the conveyors 17 and 26. A belt pulley 45 is secured to the leftward end of the shaft 44, and another belt pulley 46 is secured to a shaft 47 of a motor 48 which is mounted on the subframe 40. A belt 49 passes around the belt pulleys 45 and 46 so that the motor 48 serves to drive the saw or blade 43. A spacer 50 which is connected to the subframe 40 by a brace 51, rotably receives a shaft 52 therein. A driving pulley 53 is mounted on the leftward end of the shaft 52 and a belt 54 passes over the pulley 53 and over another pulley 55 provided on the shaft 47. A cutting member, saw or blade 56 is rotably mounted on the rightward end of the shaft 52 and said blade extends through the slots 30 of the fish holding cups 27 at a preselected angle to the path of travel of the conveyor 26 to sever the body portion of the fish in an anterior direction as it is moved longitudinally past the blade by the conveyors 17 and 26.

To complete the description of the machine 1, it should be noted that a plate 57 is provided on the frame 2 rightwardly of the cutting members 37, 43 and 56, and is positioned such that it enters the cut made by the saw or blade 37 immediately after the fish is cut thereby. The plate 57 has a first portion 58 which is substantially parallel to the path of travel of the conveyor 17 and extends from a point rightwardly of the saw or blade 37 to a point radially outwardly from the sprocket 20. The plate portion 58 is adjacent to the conveyor 17 for retaining the head portion of the fish on the conveyor 17 as the conveyor travels a path different than that of the conveyor 26. The plate 57 is provided with a second portion 59 which extends rightwardly in a substantially horizontal direction parallel to the conveyor 26 a predetermined distance from the saw or blade 37, and the plate portion 59 serves to retain the body portion of the fish on the conveyor 26.

Figures 4, 5:
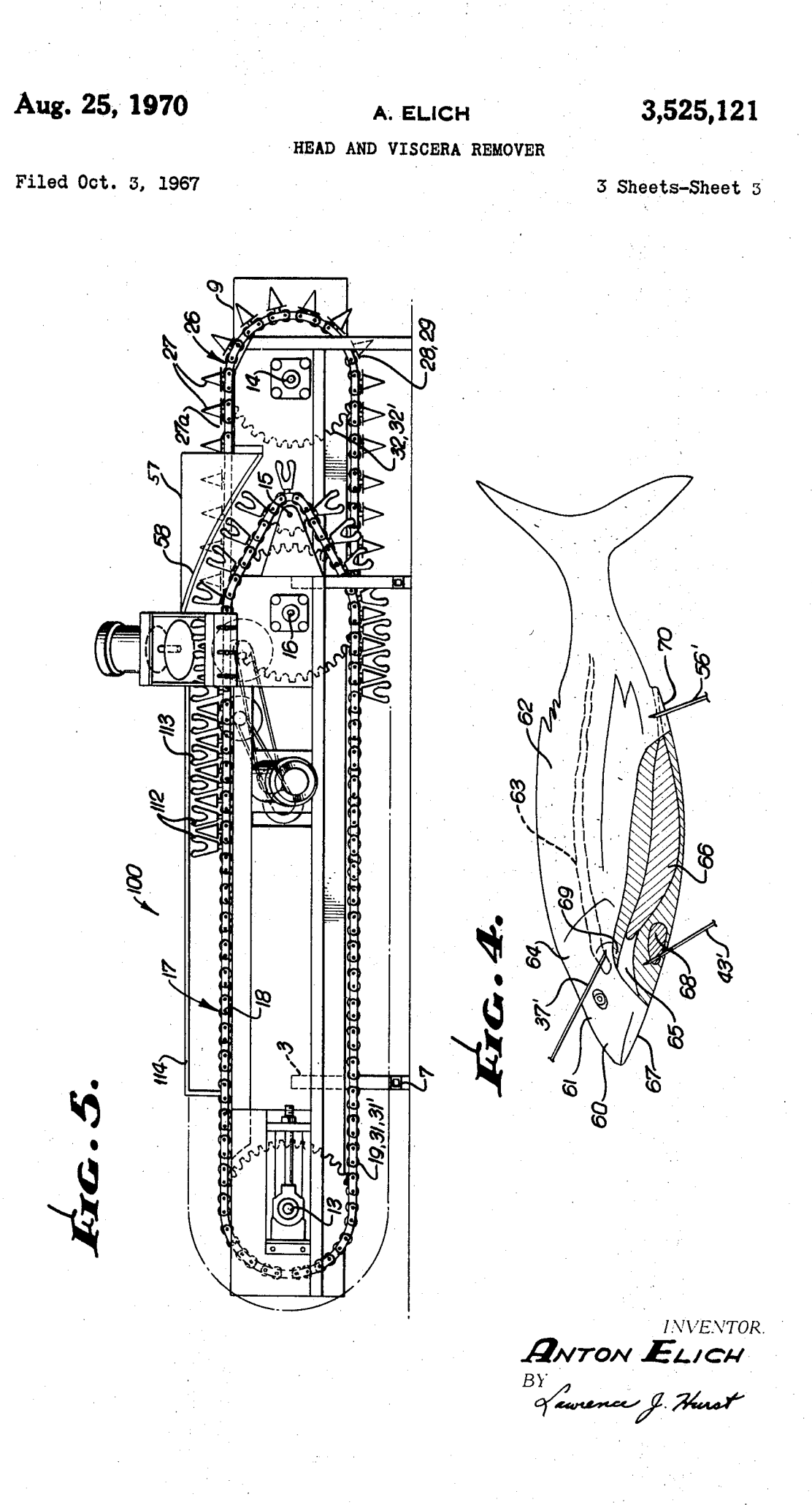

Referring now to FIG. 4, the fish is shown in cross section to illustrate the area where the cuts will be made by the saws or blades 37, 43 and 56 and to show the location of some of the vital organs of the fish in relation to these cuts. The fish comprises a head portion 60 having an eye socket bone 61 therein and a body portion 62 having a backbone 63. The saw or blade 37 is provided to cut into the fish along the line indicated generally at 37' and passes through the fish just above the eye socket bone 61 and through the first vertebra of the backbone 63. The cut 37' is made in the posterior direction so that when the head 60 is removed from the body 62, the meaty portion of the fish or horn area 64 will be retained with the body to increase the yield of usable meat recovered from the fish. It should be noted that the cut 37' is provided so that it will not pass through the esophagus 65, since the esophagus serves as a connecting link between the head 60 and the viscera 66 contained in the body portion 62.

The cut generally indicated at 43' represents that which would be made by the saw or blade 43 and is provided to cut into the fish in an anterior direction through the isthmus 67 and the heart 68 but is not deep enough to sever the esophagus 65. Thus, the gill plate or pharyngeal muscle 69 is the only tissue between the head and body portions 60, 62 which must be severed and this will be accomplished by a twisting action when the conveyor 17 moves in its direction relative to the direction of movement of conveyor 26. The other cut 56' which is made by the saw or blade 56 is directed in an anterior direction just in front of the vent area 70 and deep enough to cut through the intestine or viscera area 66.

As is evident from the drawing, the cut 56' serves to free the intestine or viscera 66 for removal from the body portion 62 and the esophagus 65 acts as the connecting link between the head portion 60 and the viscera 66, such that when the head portion 60 is twisted from the body portion 62 the viscera 66 will be removed from the body portion 62. It is possible to remove the head and viscera of the fish without making the cut 56', however it is preferred to make the cut 56' for ease of operation and to insure that all of the viscera 66 is removed from the body portion 62.

In the operation of the machine 1 with the component parts thereof in the positions shown in FIGS. 1, 2 and 3 and as described hereinabove, the motor 22 serves to rotate the conveyors 17 and 26 along their paths such that they travel in a substantially parallel path, adjacent to each other, longitudinally past the cutting members 37, 43 and 56. The fish are placed on the conveyors 17 and 26 at the leftward end of the machine 1 with the belly down and due to the wedge members 36 tilting the conveyor 26, the fish slide forward into the head receiving member 23 with the nose portion thereof extending into the aperture 25 until the eye socket bone 61 of the fish abuts the periphery of said aperture. This positions the fish on the conveyors 17 and 26 in the desired manner for the cuts 37', 43' and 56' to be made. The fish are indexed by the eye socket bone 61, since this provides a positive positioning of various sized fish on the conveyors 17 and 26. As the fish are moved longitudinally by the conveyors 17 and 26, the saw or blade 56 cuts through the fish in the vent area 70 in a slightly anterior direction to sever the digestive tract, gut and in many cases pass through the kidneys to free the viscera 66 from the body portion 62. The fish then continues to move rightwardly past the saws or blades 37 and 43, which make their cuts in the fish. The saw or blade 37 cuts into the fish through the backbone 63 in a posterior direction and the saw or blade 40 cuts into the fish in an anterior direction to sever the isthmus 67. As previously mentioned, the base portion 24 of the head receiving member 23 is provided with one side which is higher than the other, and this is important since the higher side serves as a backing and gives rigidity to the fish as the cuts 37' and 43' are made. Therefore, the cuts 37' and 43' may be made without the saws or blades 37 and 43 carrying the fish up and out of the head receiving member 23, which insures a more efficient and uniform positioning of these cuts. After the cuts are made the conveyors 17 and 26 carry the fish to a position where the plate 57 enters the cut 37' made by the blade 37, and thereafter as the conveyor 17 begins to follow its shorter path and moves in a radial direction from the path of travel of the conveyor 26, plate portion 58 serves to retain the head 60 with the fish head receiving member 23 and the plate portion 59 serves to retain the body portion 62 on the conveyor 26. Thus with the head of the fish 60 following a different path of travel than the body portion 62, the relative movement of the conveyors 17 and 26 serves to twist or rotate the head 60 relative to the body 62 about the cuts 43' and 37' which easily severs the pharyngeal muscle 69 and removes the head 60 and viscera 66 connected thereto from the body 62.

Referring now to FIG. 5 another machine 100 for removing the head and viscera from a fish is shown having substantially the same component parts and functioning in substantially the same manner as the previously described machine 1 with the following exceptions.

The indexing or head holding members 112 provided on the conveyor 17 have a substantially V-shaped opening 113 for receiving the head portion 60 of the fish. A head retaining bar member 114 which is connected to the frame 2 extends from the leftward end of the machine 100 to a point above and radially outwardly from the sprocket 20, and adjacent to the portion 58 of the plate member 57. The bar member 114 also extends parallel to and is spaced a predetermined distance from the head receiving members 112. It should be noted that the bar member 114 in conjunction with the V-shaped opening 113 and the head holding member 112, effectively define the indexing aperture as represented by 25 in FIG. 2, and serves to position the fish on the conveyors 17 and 26 in the same manner.

Therefore, when the fish is placed on the conveyors 17 and 26 the fish slides forward toward the conveyor 17, due to the wedges 36 under the fish holding members 27, the V-shaped opening 113 and bar member 114 abut the eye socket bone 61 of the fish to properly position the fish on the conveyors 17 and 26. As described hereinabove, the fish is moved along by the conveyors 17 and 26, and the cuts 37', 43' and 56' are made in the fish with the plate 57 entering the cut 37' as the conveyors 17 and 26 move along their different paths to twist or rotate the head 60 relative to the body 62 of the fish to remove the head and viscera therefrom. As is obvious, when the conveyor 17 has moved the head and viscera of the fish to a position where the plate portion 58 terminates, the head is completely separated from the body of the fish. Since the bar member 114 ends where the plate portion 58 terminates, the head of the fish is no longer retained on the conveyor 17 and is free to drop from said conveyor as the conveyor turns about the sprocket 20.

From the foregoing, it is now apparent that a novel machine, for removing the head and viscera from a fish, meeting the objects set uot hereinbefore is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A machine for removing the head and viscera from the body of a fish comprising a frame, a first conveyor having cups adapted to receive the body of said fish, a second conveyor adjacent to said first conveyor and defining a path of travel predeterminately less than the path of travel of said first conveyor, locating means on said second conveyor for receiving the head of said fish, means for revolving said first and second conveyors, first cutting means above said first and second conveyors adapted to cut longitudinally into said fish through the vertebral column between the head and body, in a generally posterior direction, second cutting means beneath said first and second conveyors adapted to cut longitudinally into said fish through the isthmus in a generally anterior direction, and third cutting means beneath said first conveyor adapted to cut longitudinally into said fish through the vent area in a generally anterior direction to sever the viscera therein, said locating means positions said fish on said first and second conveyors for said first, second and third cuts, said first and second conveyors being movable in a substantially horizontal direction as said first, second and third cuts are made and thereafter said second conveyor moves in a substantially radial direction while said first conveyor continues to move in the horizontal direction to twist the head of said fish relative to body thereof at said first and second cuts to remove the head and viscera from the body of said fish.

2. A machine for removing the head and viscera of a fish comprising a frame, a first conveyor for holding the body of said fish, a second conveyor for holding the head of said fish, indexing means on said second conveyor adapted to receive the head portion of the fish to predeterminately position the fish on said first and second conveyors, means to rotate said first and second conveyors, said second conveyor having a shorter path of travel than said first cocnveyor, cutting means connected to said frame above said first and second conveyors, said cutting means being predeterminately positioned to cut the fish between the head and body thereof in a posterior direction as the fish moves past said cutting means to retain the meat portion above the eyes of the fish with the body, other cutting means connected to said frame beneath said first conveyor and adapted to cut into said fish through the vent area to sever the digestive tract from the body of said fish, said first and second conveyors being movable along a path of travel past said cutting means for the cuts to be made through the fish, other means on said frame adapted to be inserted into the cut made by said cutting means between the head and body of the fish to retain the head of the fish on said second conveyor and the body of the fish on said first conveyor, and said second conveyor being movable in a direction different than that of said first conveyor to rotate the head of the fish relative to the body thereof at the cut to remove the head and viscera therefrom.

3. The machine according to claim 2 including other cutting means connected to said frame beneath said first and second conveyors and adapted to cut into said fish through the isthmus thereof.

4. The machine according to claim 2 wherein said indexing means comprises cups having an opening therein on said second conveyor and an abutment means on said frame a predetermined distance above said second conveyor, said cup opening and abutment means defining a predetermined aperture for receiving the head of the fish to engage the eyebone portion of the head to position the fish on said first and second conveyors for said cutting means.

5. The machine according to claim 2 wherein said indexing means comprises a cup having an aperture therein on said second conveyor for receiving the head of the fish, the aperture being of a predetermined size to engage the eyebone portion of the head to position the fish on said first and second conveyors for said cutting means.

References Cited

UNITED STATES PATENTS 2,304,337  12/1942  Christiansen _____ 17—3

FOREIGN PATENTS

| 763,392 | 2/1934 | France. |
| 809,475 | 7/1951 | Germany. |
| 673,398 | 6/1952 | Great Britain. |
| 75,448 | 7/1954 | Netherlands. |
| 81,477 | 3/1953 | Norway. |

LUCIE H. LAUDENSLAGER, Primary Examiner